C. A. VAN HORN.
Churn.

No. 67,615. Patented Aug. 6, 1867.

WITNESSES:
A. E. Andrews.
Oliver Wᵐ Seamans

INVENTOR:
Charles A. Van Horn.

United States Patent Office.

CHARLES A. VAN HORN, OF CHENANGO, NEW YORK.

Letters Patent No. 67,615, dated August 6, 1867.

---

CHURNS.

---

The Schedule referred to in these Letters Patent and making part of the same.

---

TO ALL WHOM IT MAY CONCERN:

Be it known that I, CHARLES A. VAN HORN, of the town of Chenango, in the county of Broome, and State of New York, have invented a new and useful Improvement on Churns for Making Butter; and I do hereby declare that the following is a full, clear, and exact description of the construction and operation of the same, reference being had to the annexed drawings, making a part of this specification, in which—

Like letters of reference indicate like parts.

Figure 1:
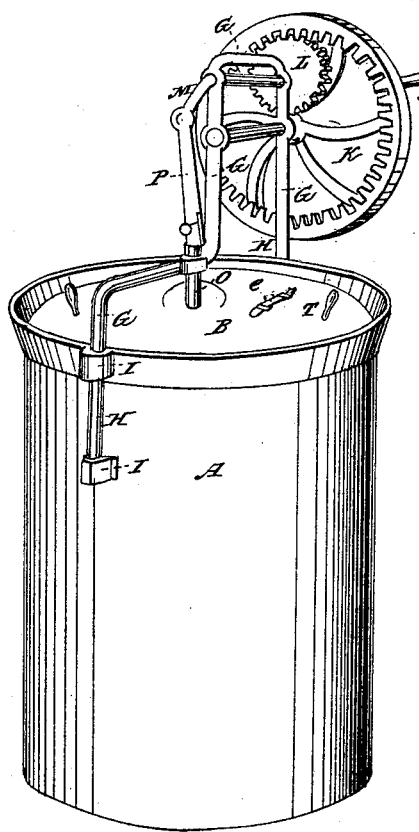
Figure 1 is a perspective view, showing the parts in working position.
Figure 2:
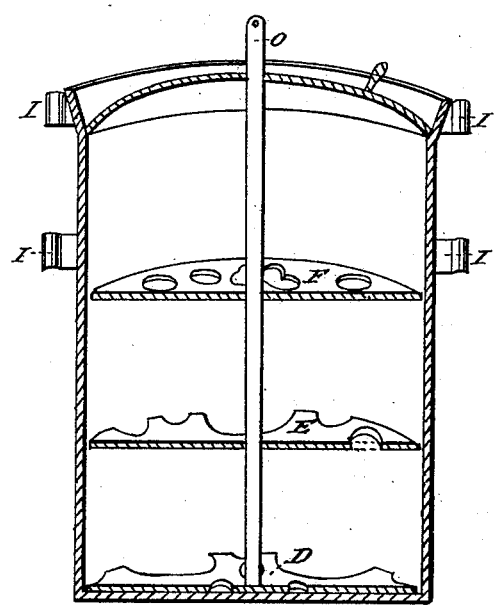
Figure 2 is a vertical cross-section of the same, representing the relative position of the "dashers" on the shaft.

The nature of my invention consists in the construction of a churn with two "dashers" and a perforated disk, placed at equal distances apart on the shaft. The object of the disk is to check the violence of the cream against the cover, and, as it has a larger surface than the "dashers" under it, to increase the agitation caused by changing the motion of the shaft. It also consists in working the "dashers" by means of a crank operated by gear-work, whereby increased motion may be given to the "dashers," thus facilitating the rupture of the globules.

To enable others skilled in the art to make and use my invention, I will proceed to describe its construction and operation.

I construct the cylinder A of wood or other suitable material, in the usual form. For the purpose of removing the cover B while the gearing is attached to the churn, I make an opening from the edge to the centre the width of the diameter of the hole for the "rod" or shaft, so that the cover can be readily taken off. Said opening is closed by a corresponding piece, T, and secured by a slide, C. I attach to the shaft, at equal distances, two "dashers," D and E, and a perforated disk, F, which is larger in diameter than the "dashers," so that when moving upwards the force of the agitated cream impinges upon it instead of the cover. The two "dashers" D and E produce the same effect upon each other by the rapid change of direction. I construct the frame G G G for the gear-work of iron or other suitable metallic substance, and attach it to the churn by inserting the legs H H into the perforated brackets I I attached to the opposite sides. Upon the shaft J I attach an inside geared driving-wheel, K, which takes into the pinion L upon the end of the shaft, to which is attached the crank M, which, for an ordinary-sized churn, should give a six-inch stroke to the "dashers." The crank connects with the churn-shaft O by the connecting-rod P. When the churn is operated by hand, the driving-wheel is turned by the handle N; if by other power, I use the ordinary pulley and belt.

When I use my improvement, after filling the churn with the proper quantity of cream I put on the cover, then apply the power to the driving-wheel, giving it about fifty revolutions a minute. The successive "dashers," by their rapid movement and change of direction, tend to distribute the air equally throughout the churn, while the violent agitation of the cream impinging upon the disk F soon ruptures the globules, without crushing the granules of the butter. The operation of churning seldom exceeds ten or fifteen minutes, and produces a better article than by any other method that I know of. After removing the butter and milk from the churn, I drop the "dashers" into their position, pour in a quantity of hot water, and give motion to the driving-wheel K. This thoroughly cleanses the whole apparatus preparatory to another operation.

I am aware that there are other churn arrangements that are similar in some respects to my improvement, but so far as I know they are generally more complicated and less effective, more liable to get out of order, and not producing so good an article. I therefore disclaim all such, and confine myself to the novel features of my improvement.

Having thus described my invention, what I claim, and desire to secure by Letters Patent, is—

The arrangement of the gear-frame G G G, in combination with the "dashers" D and E and perforated disk F, all being constructed and arranged substantially as set forth.

CHARLES A. VAN HORN.

Witnesses:
OLIVER W. SEAMANS,
A. E. ANDREWS.